(12) United States Patent
Maier et al.

(10) Patent No.: US 9,331,350 B2
(45) Date of Patent: May 3, 2016

(54) FUEL CELL SYSTEM INCLUDING DIAGNOSTIC TECHNIQUE FOR UNBALANCED COMPRESSOR

(71) Applicant: GM GLOBAL TECHNOLOGY OPERATIONS LLC, Detroit, MI (US)

(72) Inventors: Oliver Maier, Worms (DE); Bernd Peter Elgas, Hilbersheim (DE); Ulrich Dumke, Ruesselsheim (DE); Peter Willimowski, Rossdorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 14/269,922

(22) Filed: May 5, 2014

(65) Prior Publication Data

US 2014/0242491 A1     Aug. 28, 2014

Related U.S. Application Data

(62) Division of application No. 11/464,540, filed on Aug. 15, 2006, now Pat. No. 8,771,891.

(51) Int. Cl.
*H01M 10/04* (2006.01)
*H01M 8/04* (2016.01)
*F04D 27/00* (2006.01)
*F04D 29/66* (2006.01)
*H02H 7/09* (2006.01)

(52) U.S. Cl.
CPC ......... *H01M 8/04686* (2013.01); *F04D 27/001* (2013.01); *F04D 29/662* (2013.01); *H01M 8/04089* (2013.01); *H02H 7/09* (2013.01); *F04C 2240/50* (2013.01); *F04C 2270/80* (2013.01); *Y02E 60/50* (2013.01)

(58) Field of Classification Search
CPC ...................................................... H01M 10/04
See application file for complete search history.

(56) References Cited

U.S. PATENT DOCUMENTS

| | | | | | |
|---|---|---|---|---|---|
| 5,202,824 | A | * | 4/1993 | Chen | 700/279 |
| 5,313,399 | A | * | 5/1994 | Beale | 701/124 |
| 6,296,441 | B1 | * | 10/2001 | Gozdawa | 415/180 |
| 7,539,549 | B1 | * | 5/2009 | Discenzo et al. | 700/28 |
| 2004/0169977 | A1 | * | 9/2004 | Kotula | 361/93.1 |
| 2004/0244485 | A1 | * | 12/2004 | Joseph et al. | 73/514.26 |
| 2005/0196659 | A1 | * | 9/2005 | Grieve et al. | 429/34 |
| 2005/0262862 | A1 | * | 12/2005 | Moffitt | 62/271 |

\* cited by examiner

*Primary Examiner* — Jacob Marks
(74) *Attorney, Agent, or Firm* — John A. Miller; Miller IP Group, PLC

(57) ABSTRACT

A diagnostic system for determining whether a rotor shaft of a compressor is unbalanced. The compressor includes a displacement sensor that measures the displacement of the rotor shaft as it is rotating. The sensor dynamic frequency signal is sent to a bandpass filter that filters out an eigen-frequency frequency that is a function of shaft elasticity and rotor dynamics. The filtered frequency signal is then rectified by a rectifier to make the filtered frequency signal positive. The rectified signal is then passed through a low pass filter that converts the rectified signal to a DC signal. The DC signal is then sent to a controller that determines if the amplitude of the signal is above a predetermined threshold, which indicates a problem with the balance of the compressor.

15 Claims, 3 Drawing Sheets

FUEL CELL SYSTEM INCLUDING DIAGNOSTIC TECHNIQUE FOR UNBALANCED COMPRESSOR

CROSS-REFERENCE TO RELATED APPLICATIONS

This application is a Divisional application of U.S. patent application Ser. No. 11/464,540, filed Aug. 15, 2006, titled "Diagnostic System for Unbalanced Motor Shafts for High Speed Compressor".

BACKGROUND OF THE INVENTION

1. Field of the Invention

This invention relates generally to a system for determining whether a compressor is unbalanced and, more particularly, to a system for determining whether a compressor for a fuel cell stack is unbalanced, where the system generates a DC analog signal indicative of the compressor balance from a sensor signal that includes an eigen-frequency signal and an unbalance frequency signal.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The compressor used to provide the cathode reactant gas flow is typically a high speed centrifugal air compressor that can operate up to about 80,000 RPMs. The compressor includes an electric motor that rotates a shaft coupled to a compressor wheel. If the compressor is unbalanced, i.e., the shaft has a slight oscillation, the high rotational speed of the shaft could cause damage to the compressor. Particularly, high speed compressors of this type typically use air bearings. If an unbalanced rotor shaft of the compressor contacts the air bearings, the compressor may be irreparably damaged. Therefore, it is desirable to detect small unbalances of the compressor rotor shaft for diagnostic purposes so that the compressor can be repaired before it is damaged.

SUMMARY OF THE INVENTION

In accordance with the teachings of the present invention, a diagnostic system for determining whether a rotor shaft of a compressor is unbalanced is disclosed. The compressor includes a displacement sensor that measures the displacement of the rotor shaft as it is rotating. The sensor dynamic frequency signal is sent to a bandpass filter that filters out an eigen-frequency that is a function of shaft elasticity and rotor dynamics. The filtered frequency signal is then rectified by a rectifier to make the filtered frequency signal positive. The rectified signal is then passed through a low pass filter that converts the rectified signal to a DC signal. The DC signal is then sent to a controller that determines if the amplitude of the signal is above a predetermined threshold, which indicates a problem with the balance of the compressor.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system for determining whether a compressor shaft is unbalanced is merely exemplary in nature, and is in no way intended to limit the invention or its applications or uses.

Figure 1:
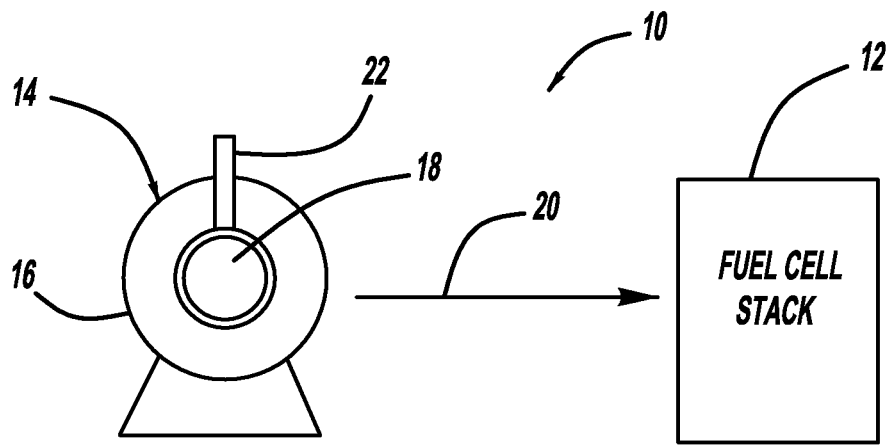
FIG. 1 is a block diagram of a fuel cell system including a compressor.

FIG. 1 is a plan view of a fuel cell system 10 including a fuel cell stack 12 and a compressor 14. As is well understood in the art, the compressor 14 provides cathode reactant air flow on line 20 to the cathode side of the fuel cell stack 12. The compressor 14 includes a stator 16 and a rotor shaft 18. The rotor shaft 18 is coupled to an impeller wheel (not shown) that rotates and provides the compressed airflow on the line 20. A displacement sensor 22 is positioned proximate the rotor shaft 18, and provides a signal of the distance between a sensing end of the sensor 22 and the rotor shaft 18 as it rotates.

Therefore, the output of the displacement sensor 22 is a dynamic frequency signal indicative of the balance of the rotor shaft 18. The displacement sensor 22 can be any suitable sensor for the purposes described herein. It is beneficial that the sensor 22 be an inexpensive sensor, such as a Hall effect sensor.

Figure 2:
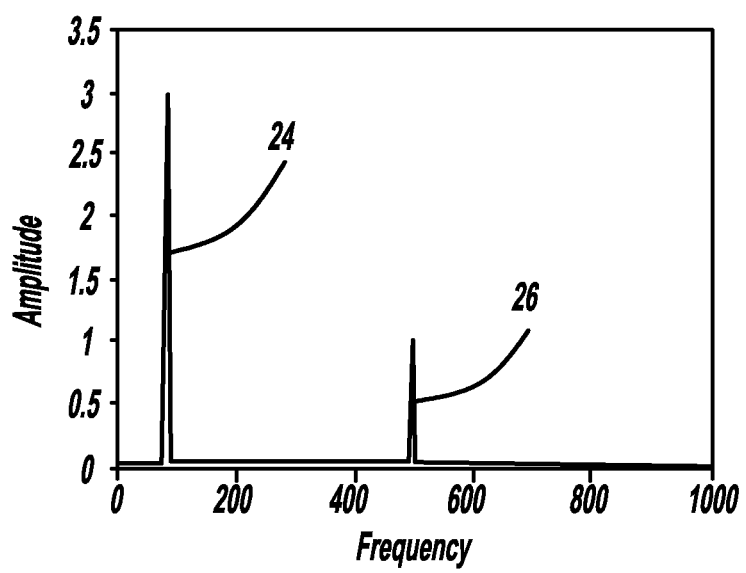
FIG. 2 is a graph with frequency on the horizontal axis and amplitude on the vertical axis showing an eigen-frequency related to shaft elasticity and rotor dynamics and an unbalance frequency related to the balance of the rotor shaft.

The frequency signal from the displacement sensor 22 can be fast Fourier transformed (FFT) to identify signal spikes indicating the balance of the rotor shaft 18. The FFT signal will include a low frequency spike (eigen-frequency) that is related to the elasticity of the rotor shaft 18 and rotor dynamics. The FFT signal will also include a high frequency spike that provides an indication of the balance of the rotor shaft 18. Particularly, the unbalance frequency spike is a function of the speed of the rotor shaft 18, and its amplitude will increase as the rotor shaft 18 becomes more unbalanced. FIG. 2 is a graph with frequency on the horizontal axis and amplitude on the vertical axis showing the fast Fourier transformed sensor signal that includes an eigen-frequency spike 24 and an unbalance frequency spike 26.

It is possible to determine the balance of the rotor shaft 18 by evaluating the analog output signal of the displacement sensor 22 by detecting the unbalance frequency spike. However, because the unbalance frequency is relatively high, a very high sample rate of the analog sensor signal would be necessary, i.e., five times the frequency of the unbalance frequency. In addition, an evaluation algorithm, such as a FFT algorithm, has to run at that high of a sample rate during real time operation. This would require a very high controller load and consequently higher controller costs.

Figure 3:
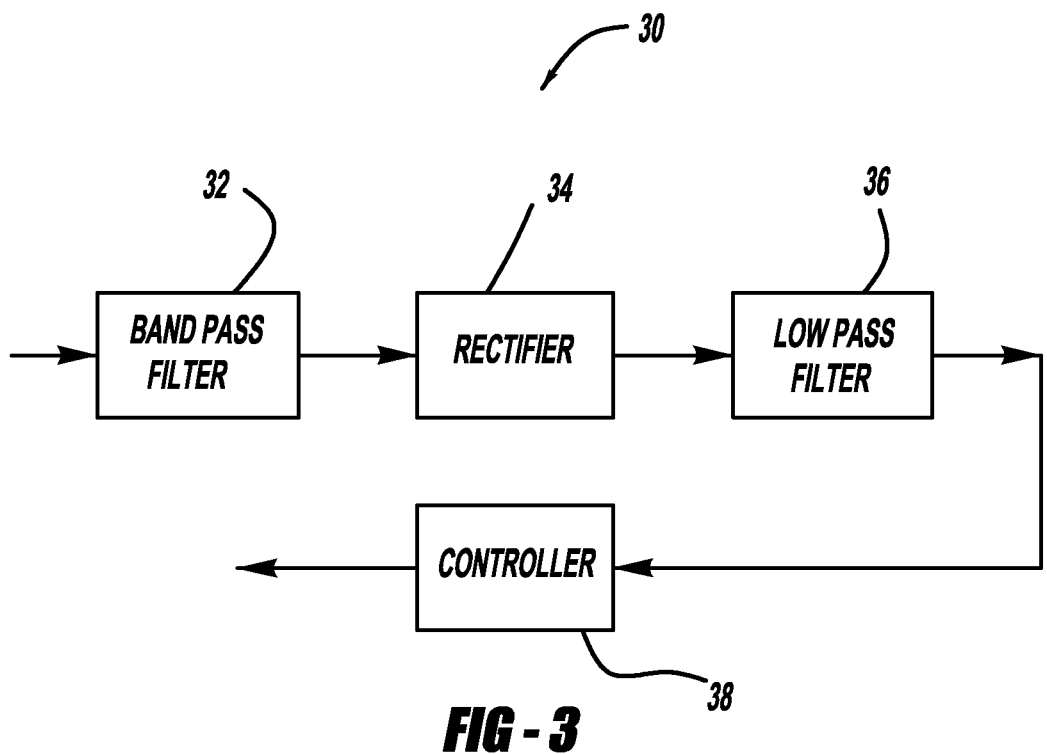
FIG. 3 is a block diagram of a system for converting a frequency signal from a displacement sensor on the compressor to an analog signal indicative of the balance of a compressor shaft, according to an embodiment of the present invention.
Figure 4:
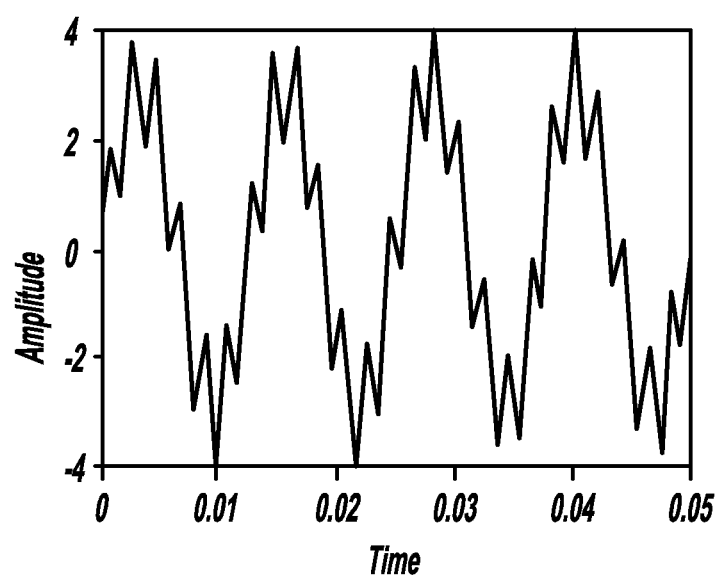
FIG. 4 is a graph with time on the horizontal axis and amplitude on the vertical axis showing a mixed eigen-frequency and unbalance frequency signal.
Figure 5:
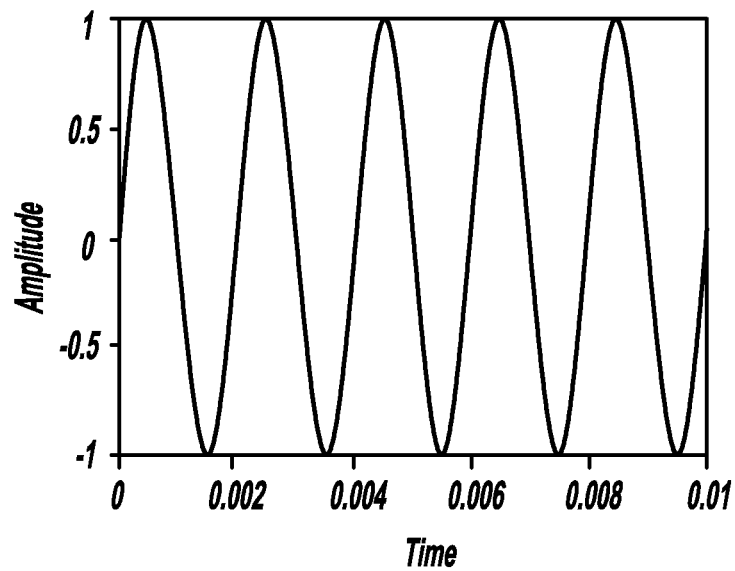
FIG. 5 is a graph with time on the horizontal axis and amplitude on the vertical axis showing a filtered unbalance frequency signal.

FIG. 3 is a block diagram of a system 30 for processing the analog frequency signal from the displacement sensor 22 to provide an indication of whether the rotor shaft 18 is unbalanced, according to an embodiment of the present invention. The analog sensor signal from the displacement sensor 22 is a combination of the eigen-frequency and the unbalance frequency, such as shown in FIG. 4. To determine whether the rotor shaft 18 is unbalanced, the eigen-frequency needs to be removed from the sensor signal so that only the unbalance frequency is left. Therefore, the sensor signal is sent to a bandpass filter 32 that removes all of the low frequencies and the high frequencies so that only a frequency signal that includes the unbalance frequency remains, such as shown in FIG. 5. The low cut-off frequency of the bandpass filter 32 is set to be a function of the lowest operational motor speed of the compressor 14 and is higher than the eigen-frequency. The high cut-off frequency of the bandpass filter 32 is set to be a function of the highest operation motor speed.

Figure 6:
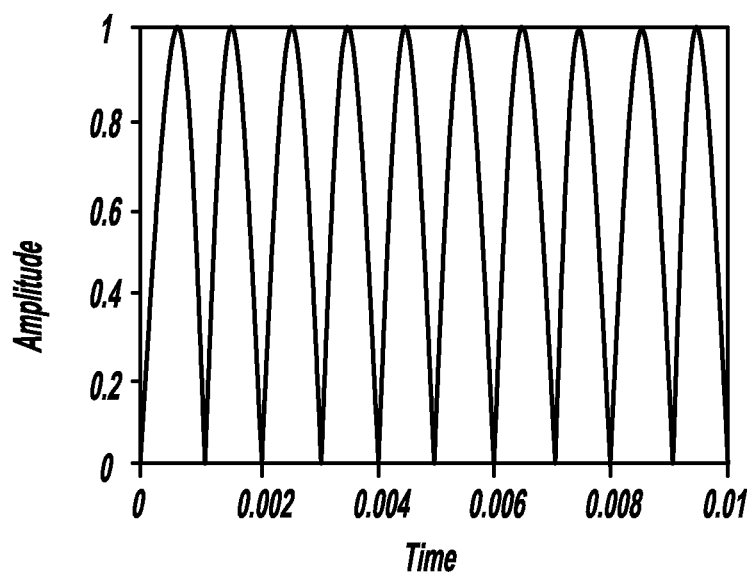
FIG. 6 is a graph with time on the horizontal axis and amplitude on the vertical axis showing a rectified unbalance frequency signal.

The filtered unbalance frequency signal is then sent to a rectifier 34 so that unbalance frequency signal is shifted to positive, i.e., the absolute value of the unbalance frequency, such as shown in FIG. 6. The rectifier 34 can be any suitable rectifier for the purposes described herein, such as an inexpensive four diode rectifier, well known to those skilled in the art. The rectified signal is then filtered by a low pass filter 36 that takes a mean or average of the absolute value of the unbalance frequency signal. The cut-off frequency signal of the low pass filter 36 is a function of the input sample rate and should be lower than the unbalance frequency at the lowest operation shaft speed. The output of the low pass filter 36 is a DC signal whose amplitude provides an indication of the balance of the rotor shaft 18. By using the system 30, the sample time for the unbalanced evaluation algorithm can be dramatically reduced.

The DC signal from the low pass filter 36 is compared to a threshold signal in a controller 38 to determine whether the rotor shaft 18 is unbalanced. Particularly, the controller 38 compares the amplitude of the DC signal from the low pass filter 36 to a threshold, and provides a signal indicating that the rotor shaft 18 is unbalanced if the amplitude of the DC signal exceeds the threshold. In one embodiment, the controller 38 uses a low threshold and a high threshold. If the amplitude of the DC signal from the low pass filter 36 is larger than the low threshold and less than the high threshold, then the controller 38 provides a warning signal of a potential compressor unbalance. If the amplitude of the DC signal is larger than the high threshold, then the controller 38 may provide system shut-down and/or system performance reduction. If the low threshold level is reached, the maximum allowable speed of the compressor 14 can be reduced.

The compressor diagnostics function of the present invention offers a number of advantages. For example, small unbalances in the rotor shaft 18 can be detected before the compressor 14 is completely damaged, providing lower cost and higher reliability. During a failure mode, a power reduction can be provided to also provide higher reliability, for example, a limp home mode. Because of the pre-evaluation with the analog electronic circuits, the unbalance signal is a DC signal. There are no high frequency inputs which lowers cost because special ECUs are not required. Further, there are no additional digital controller costs. Also, there is no complex evaluation of the signal, such as memory and calculation time required for FFT transformations. Further, there are not limits to real time operation. Also, there are no aliasing effects caused by the bandpass filter 32 and the low pass filter 36. Further, the diagnostics is not a function of the speed of the rotor shaft 18. The circuitry required in the system 30 includes analog components and are low cost, and are simple.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
 a fuel cell stack;
 a compressor providing cathode air flow to a cathode side of the fuel cell stack, said compressor including a stator, a rotor shaft and a displacement sensor, said displacement sensor being positioned proximate the rotor shaft and providing a frequency signal indicative of the balance of the rotor shaft; and
 an analog electrical circuit for determining whether the rotor shaft is unbalanced, said analog electrical circuit including a first filter that filters the frequency signal to remove unwanted frequencies and a second filter that converts the filtered frequency signal to a DC signal whose amplitude is an indication of the balance of the rotor shaft, wherein a controller of the analog electrical circuit is programmed to compare the amplitude of the DC signal to at least one threshold to determine whether the rotor shaft is unbalanced, and is programmed to cause a system shut-down, a performance reduction, or a combination thereof if the amplitude of the DC signal is greater than the at least one threshold.

2. The system according to claim 1 wherein the first filter of the analog electrical circuit is a bandpass filter that filters out an eigen-frequency signal from the sensor frequency signal that is a function of the rotor shaft elasticity and rotor dynamics.

3. The system according to claim 1 wherein the controller of the analog electrical circuit is further programmed to compare the amplitude of the DC signal to a low threshold and a high threshold, and wherein if the amplitude of the DC signal is greater than the low threshold and less than the high threshold, the controller providing a warning signal and if the amplitude of the DC signal is greater than the high threshold, then the analog electrical circuit provides system shut-down and/or a performance reduction.

4. The system according to claim 2 wherein the analog electrical circuit includes the bandpass filter for filtering the frequency signal from the displacement sensor to provide a single unbalance frequency signal, a rectifier for rectifying the filtered signal to provide a positive unbalance frequency signal, and a low pass filter for averaging the positive unbalance frequency signal to provide the DC signal.

5. The system according to claim 4 wherein the rectifier is a four diode rectifier.

6. The system according to claim 1 wherein the displacement sensor is a Hall effect sensor.

7. The system according to claim 1 wherein the compressor is a high speed centrifugal compressor employing air bearings.

8. A fuel cell system comprising:
a compressor that provides cathode air flow to a cathode side of the fuel cell stack, said compressor including a stator, a rotor shaft and a displacement sensor, said displacement sensor being positioned proximate the rotor shaft, said compressor providing a frequency signal indicative of the balance of the rotor shaft;
a first filter that removes unwanted frequencies to provide a filtered frequency;
a second filter that converts the filtered frequency to a DC signal; and
a controller that is programmed to determine whether the rotor shaft is unbalanced by comparing the amplitude of the DC signal to a low threshold and a high threshold, wherein if the amplitude of the DC signal is greater than the low threshold and less than the high threshold, the controller provides a warning signal, and if the amplitude of the DC signal is less than the low threshold, then the controller reduces the maximum allowable speed of the compressor wherein the controller is further programmed to cause a system shut-down and/or a performance reduction if the amplitude of the DC signal is greater than the high threshold.

9. The system according to claim 8 wherein the first filter is a bandpass filter that filters out an eigen-frequency signal from the sensor frequency signal that is a function of the rotor shaft elasticity and rotor dynamics.

10. The system according to claim 8 wherein the first filter filters the frequency signal from the displacement sensor to provide the filtered frequency that is a single unbalance frequency signal.

11. The system according to claim 8 further comprising a rectifier that rectifies the filtered frequency signal to provide a positive unbalance frequency signal.

12. The system according to claim 11 wherein the second filter is a low pass filter that averages the positive unbalance frequency signal from the rectifier to provide the DC signal.

13. The system according to claim 11 wherein the rectifier is a four diode rectifier.

14. The system according to claim 8 wherein the displacement sensor is a Hall effect sensor.

15. The system according to claim 8 wherein the compressor is a high speed centrifugal compressor employing air bearings.

* * * * *